(No Model.)

J. KING.
VALVE OPERATING MECHANISM FOR TANKS.

No. 461,439. Patented Oct. 20, 1891.

Witnesses.
J. Jessen
C. G. Hawley

Inventor:
John King.
By Paul & Merwin Attys

THE NORRIS PETERS CO., PHOTO-LITHO., WASHINGTON, D. C.

UNITED STATES PATENT OFFICE.

JOHN KING, OF MINNEAPOLIS, MINNESOTA.

VALVE-OPERATING MECHANISM FOR TANKS.

SPECIFICATION forming part of Letters Patent No. 461,439, dated October 20, 1891.

Application filed April 16, 1891. Serial No. 389,131. (No model.)

*To all whom it may concern:*

Be it known that I, JOHN KING, of Minneapolis, in the county of Hennepin and State of Minnesota, have invented a certain Improved Valve-Operating Mechanism for Tanks, of which the following is a specification.

My invention relates to means adapted for use in connection with tank or reservoir valves, whereby absolute and certain action of the same is insured.

The object of the invention is to provide means whereby a sudden and strong force is applied at a predetermined instant to firmly and tightly seat the disk, cone, or ball of the valve, or, acting oppositely, to throw the valve open, whereby all undesirable leakage is prevented.

My invention consists in the combination of a tank or reservoir and the valve or valves thereof with a float in connection with said valve or valves, a tilting way or guide with a weight or weights adapted to move thereon, and a connection between said guide and said float, whereby as the level of the liquid in the tank or reservoir changes said valve is forcibly operated by the action of said float and weights; and, further, the invention consists in means for accurately adjusting the throw or travel of the weight device or devices, and in various details of construction, and in combinations hereinafter described, and particularly pointed out in the claims.

My invention will be more readily understood by reference to the accompanying drawings, in which—

Figure 1:
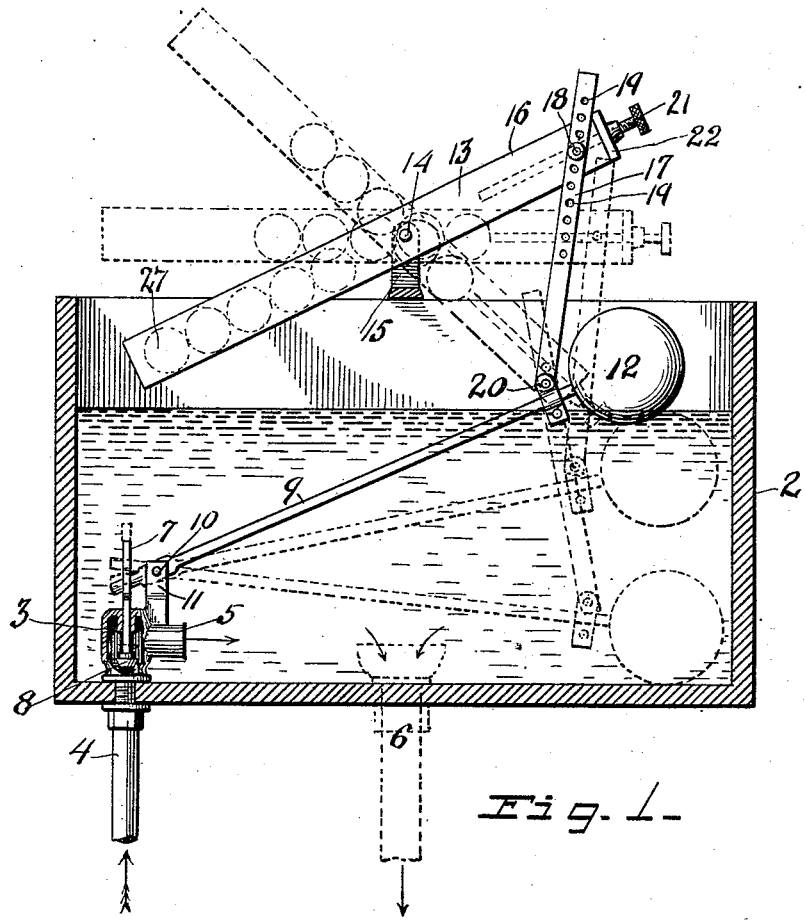
Figure 2:
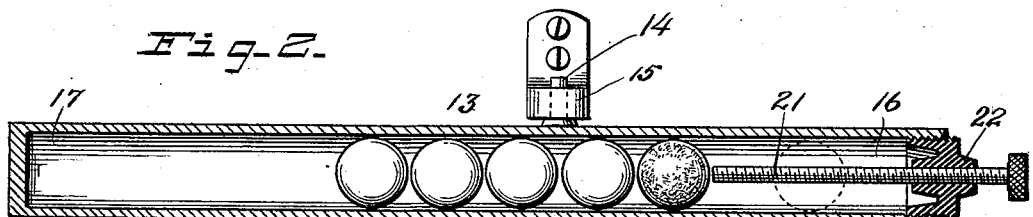
Figures 3, 4:
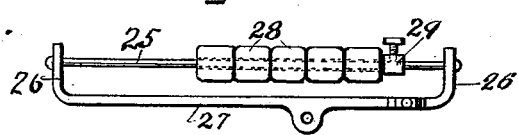

Figure 1 is a vertical sectional view of a tank and valve equipped with apparatus embodying my invention. Fig. 2 is a horizontal section of the guide or way shown in Fig. 1, the same being enlarged to more clearly show the detail construction. Figs. 3 and 4 are respectively side and plan views of a modified form of my guide or way.

As shown in the drawings, the tank 2 is provided with the inlet-valve 3, into which the water enters through the pipe 4 and passes out through the nozzle 5. An outlet-valve 6 is indicated in dotted lines. The stem 7 of the valve 3, carrying the valve-disk 8 on its lower end, is adapted to be raised or lowered by the movement of the lever or rod 9, pivoted at 10 on the arm 11, extending up from the valve-globe. The lever 9 is attached to and adapted to be operated by the float 12, resting upon the surface of the water or other fluid in the tank.

In order to prevent the overflow of the tank, the inlet-valve must be closed at the proper time. Ordinarily the buoyancy of the float has alone been relied upon to raise the free end of the lever and close the valve. In practice, however, it has been found that the action of the lever 9 is too slow to firmly and properly close the valve. As a consequence of the valve-disk being only loosely held upon its seat a small quantity of water constantly leaks through into the tank, eventually resulting in the overflow of the same. This slight but continued leakage or seepage is what I aim to prevent, and to do so I provide means for forcibly jamming the valve-disk or ball against its seat to firmly fix it in position against all points thereof. The preferable form of apparatus which I employ is shown in Figs. 1 and 2, and consists in the tubular guide or way 13, pivoted on trunnions 14, having bearings in the angle-lugs fixed on a suitable support. Within the tube I provide a rolling or sliding weight or weights, preferably in the form of metal balls. (Shown most plainly in Fig. 2.) These balls are adapted to roll from one end of the tube to the other as the same is tilted upon its trunnions. The forward end 16 of the tube is pivotally connected with the lever 9 by the link 17, secured upon a pin or lug 18, extending laterally from the side of the tube. The combined weight of the balls when in the end 27 of the tube is less than that of the other end of the tube plus the weight of the link 17, the lever 9, and the float 12 when the latter is unsupported. Consequently when the water is let out of the tank the float 12 falls with the lowering surface thereof and pulls down the end 16 of the tube, whereupon the weights or balls move into that end. I provide a number of holes 19 at regular distances in the link 17, each hole being large enough to admit the end of the threaded pin 18. The link is secured upon the pin by a suitable burr or nut. By varying the length of the link, by which is meant the distance between the pin 18 and the pivot of the movable block or clip 20, clamped upon the lever 9, the height to which the water may rise in the tank may be regulated. Now if the weight-balls were allowed to roll clear down into the end 16 of the tube, then the weight would be so great as to prevent the float from rising when the tank was again filled. Hence I provide means for limiting the forward throw or movement of the weights, while at the same time retaining sufficient lever length in the forward part of the tube. My object is to leave just enough weight on the forward end of the tube or guide to overbalance the end 17 thereof. For this purpose I provide the long threaded screw 21, passing through a threaded opening in the plug or cap 22, secured in the forward end of the tube. By the adjustment of the screw the travel of the balls may be accurately gaged. In addition to this I sometimes employ light glass space-balls disposed at the ends of the row of balls or between the heavy balls, thereby properly distributing the weight on each side of the pivot-point. Such a ball is indicated in Fig. 2 at the forward end of the row.

In Figs. 3 and 4 I have illustrated one of the modified forms in which my invention may be employed. Instead of using a tube I provide a taut wire or rod 25, extended between the ends 26 of the rigid bar 27. This bar is adapted to be pivoted in much the same manner as the tube shown in the preceding figures and is provided with a lug or pin 18 to receive the link 17. Sliding weights 28 take the place of the balls and are limited in their forward movement on the guide 25 by an adjustable stop 29, suitably secured thereon.

Referring to Fig. 1, suppose the water to be at the level shown and the apparatus to be in the position indicated in full lines. Now if the water was drawn off through the outlet-valve 6, the float 12, being unsupported, would gradually fall to the lower position, thereby tilting the guide over into the forward extreme position, whereupon the balls would roll into the end 16 thereof and against the end of the adjustable stop-screw 21, indicated in dotted lines. When in this position the the combined weight of the apparatus on the forward side of the pivot-point 14 is great enough to prevent the float from rising until almost submerged by the water flowing in through the open tank-valve. At this time the float begins to gradually rise until, arriving at the intermediate dotted position, the tube is thrown into a horizontal position. The next instant the tube is tilted slightly backward, whereupon the balls, rolling suddenly into the end 17 thereof, cause the tube to tilt quickly backward and suddenly pull the float up into the full-line position, thereby forcibly seating the valve-disk 8 and completely shutting off the flow of water into the tank. The position of the clamp 20 and the length of the link 17 are so adjusted that the float is not entirely raised out of the water when the guide tips back. Hence a portion of the weight of the float is still supported by the water.

It is obvious that various modifications in my device would readily suggest themselves to one skilled in the art, and I therefore do not confine myself to the exact construction shown and described.

Having thus described my invention, I claim as new and desire to secure by Letters Patent—

1. The combination, in a device of the class described, of a tank with a valve therefor, a float provided in connection with said valve, a tilting way or guide, a movable weight or weights in connection therewith, and means for adjusting the throw thereof and for connecting said way or guide with said float and valve, substantially as and for the purpose specified.

2. The combination, with a tank or reservoir, of a valve provided in connection therewith, a float in connection with said valve, a tilting way or guide, weights arranged therewith, means for adjusting the throw thereof, and an adjustable connection between said way or guide and said float and valve, substantially as described.

3. The combination of a tank and the valve therefor with an operating-lever and a float for said valve, a tilting way or guide arranged above the same, a movable weight or weights in connection therewith, means for adjusting the throw of the same, and the pivoted link 17, provided with a series of pivot openings or holes 19, substantially as described.

4. The combination, with a tank and a tank-valve, of a float in connection therewith, a tilting way or guide, weight-balls arranged therein, the adjustable stop-screw 21, and the link 17, having openings 19, adapted to receive a suitable pin or lug provided on said way or guide, substantially as described.

5. The combination, in a device of the class described, of the tank and tank-valve, with the operating-lever 9, a float 12, a tilting tube 13, arranged upon trunnions, weight-balls provided therein, an adjustable stop 21, the pin 18, the link 17, provided with holes 19, adapted to receive said pin, and an adjustable pivot-block 20 upon said lever 9, substantially as described.

6. The combination, in a device of the class described, of the guide or way adapted to tilt, as described, with a float, a connection between the same, movable weights provided in connection with said way or guide, and light space-pieces in connection therewith, whereby the desired disposition of said weights with respect to said guide or way is attained, substantially as described.

In testimony whereof I have set my hand this 9th day of April, 1891.

JOHN KING.

In presence of—
C. G. HAWLEY,
FRED S. LYON.